June 27, 1961  A. F. TEXTOR  2,990,073
MACHINE FOR CONVEYING AND DUMPING MILK CANS
Filed March 4, 1959  5 Sheets-Sheet 1
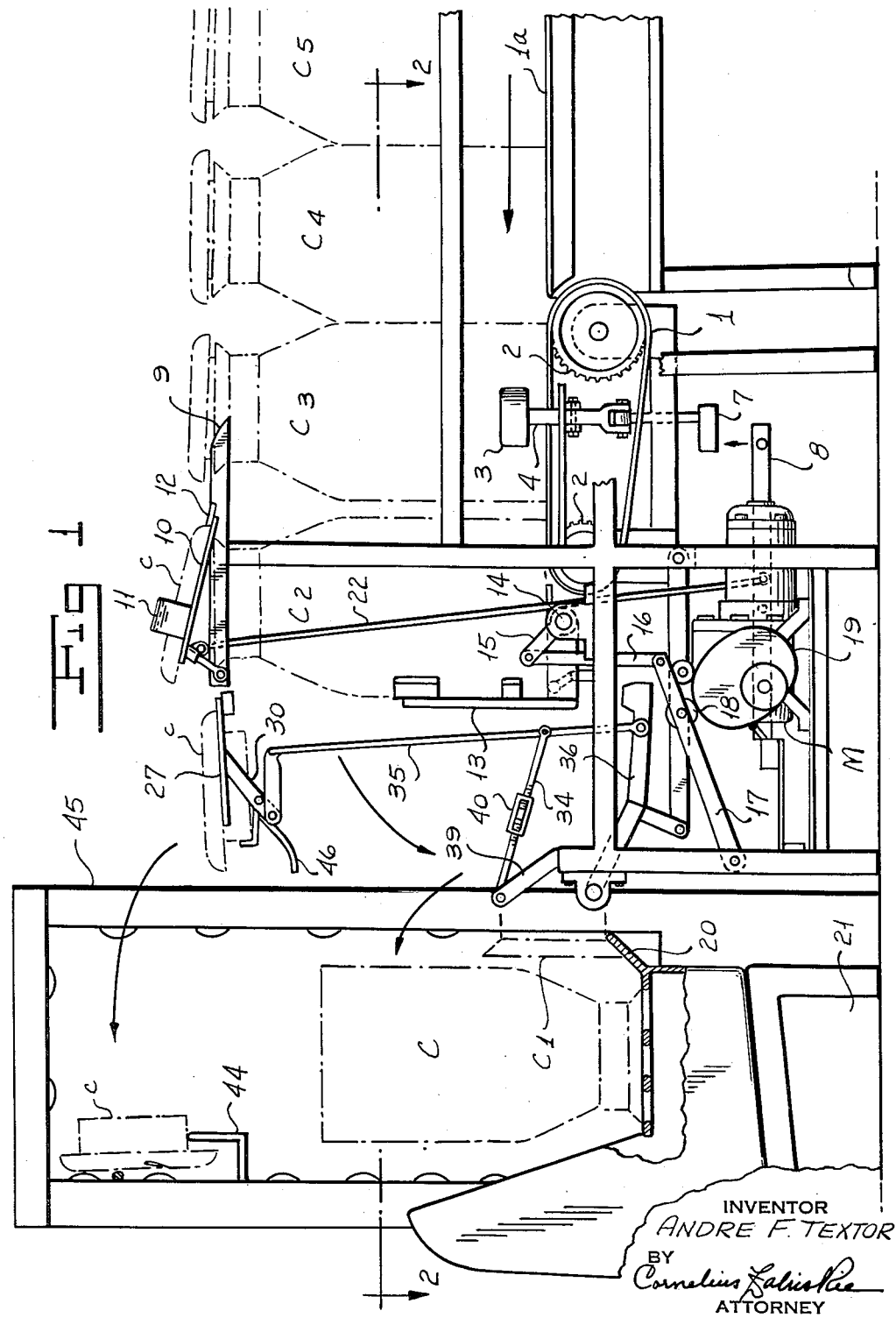
INVENTOR
ANDRE F. TEXTOR
BY
Cornelius Zabriskie
ATTORNEY

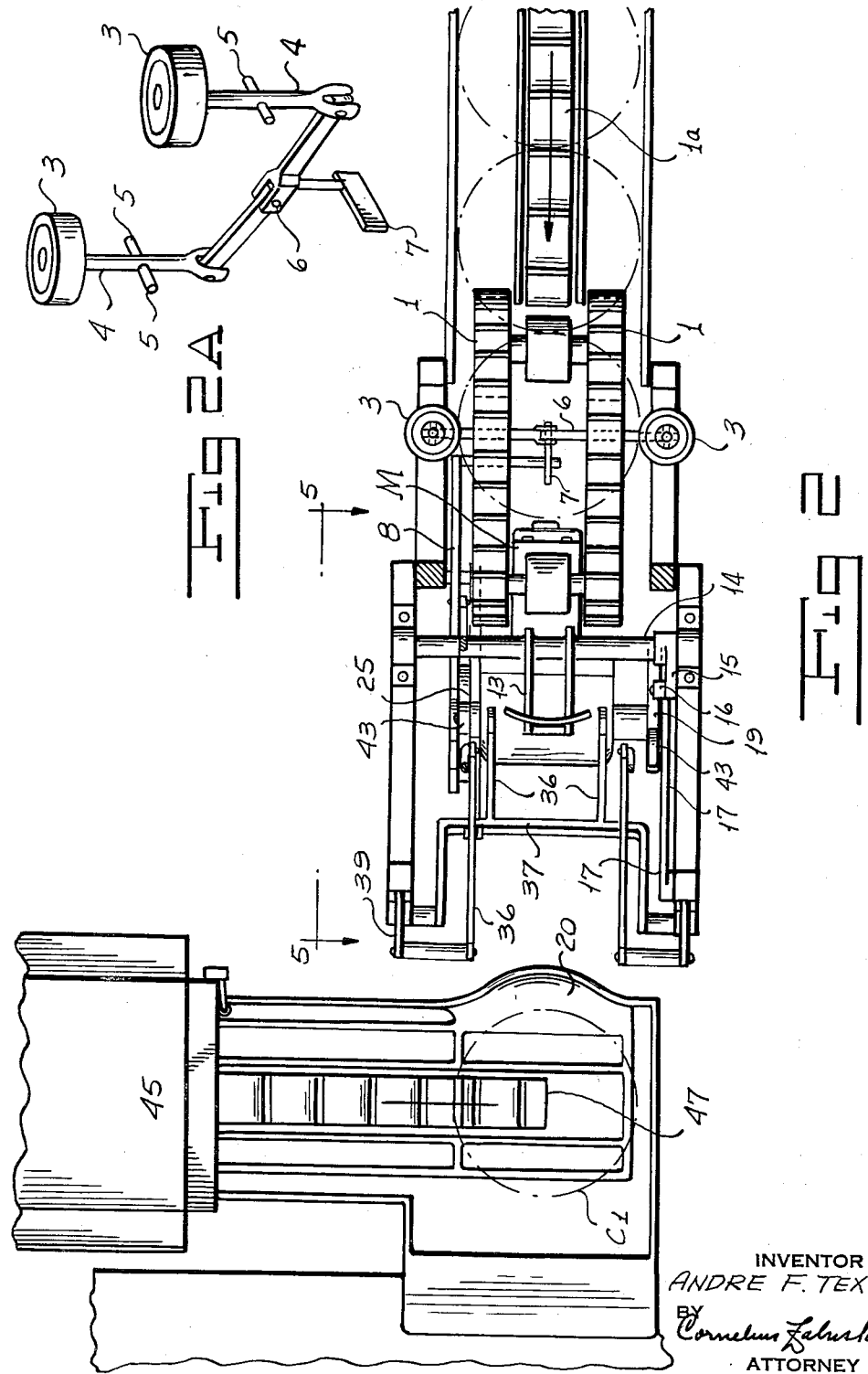

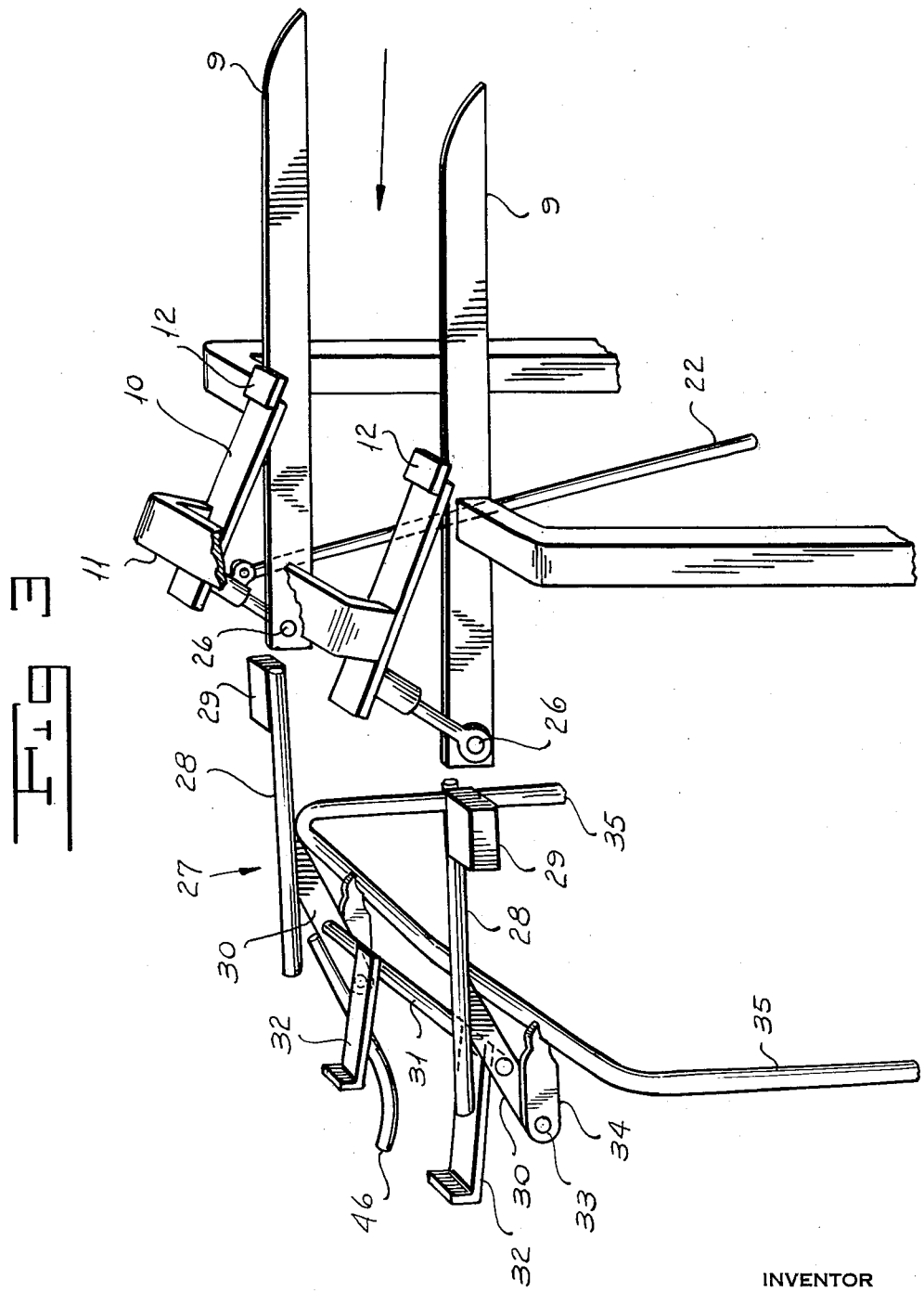

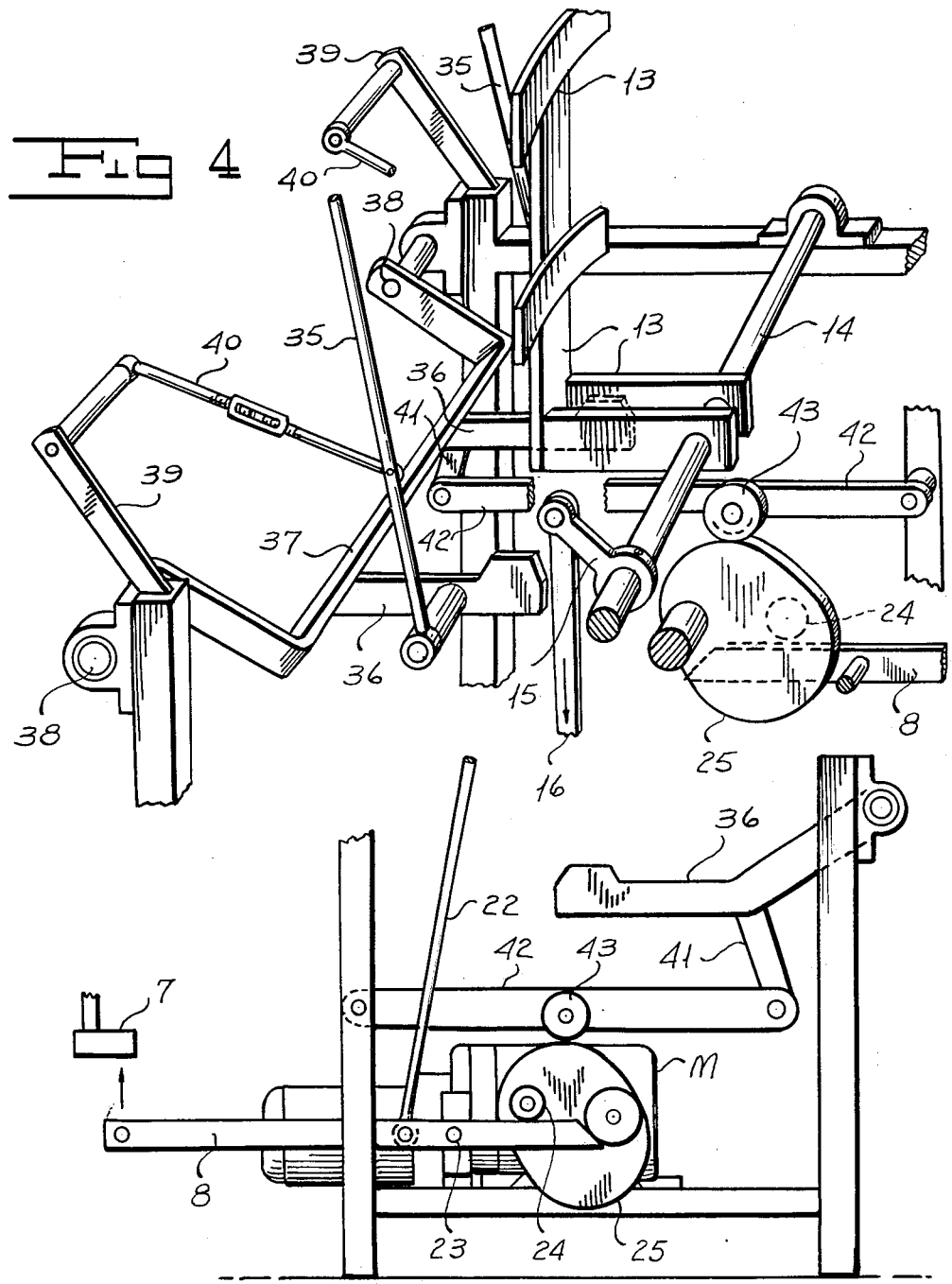

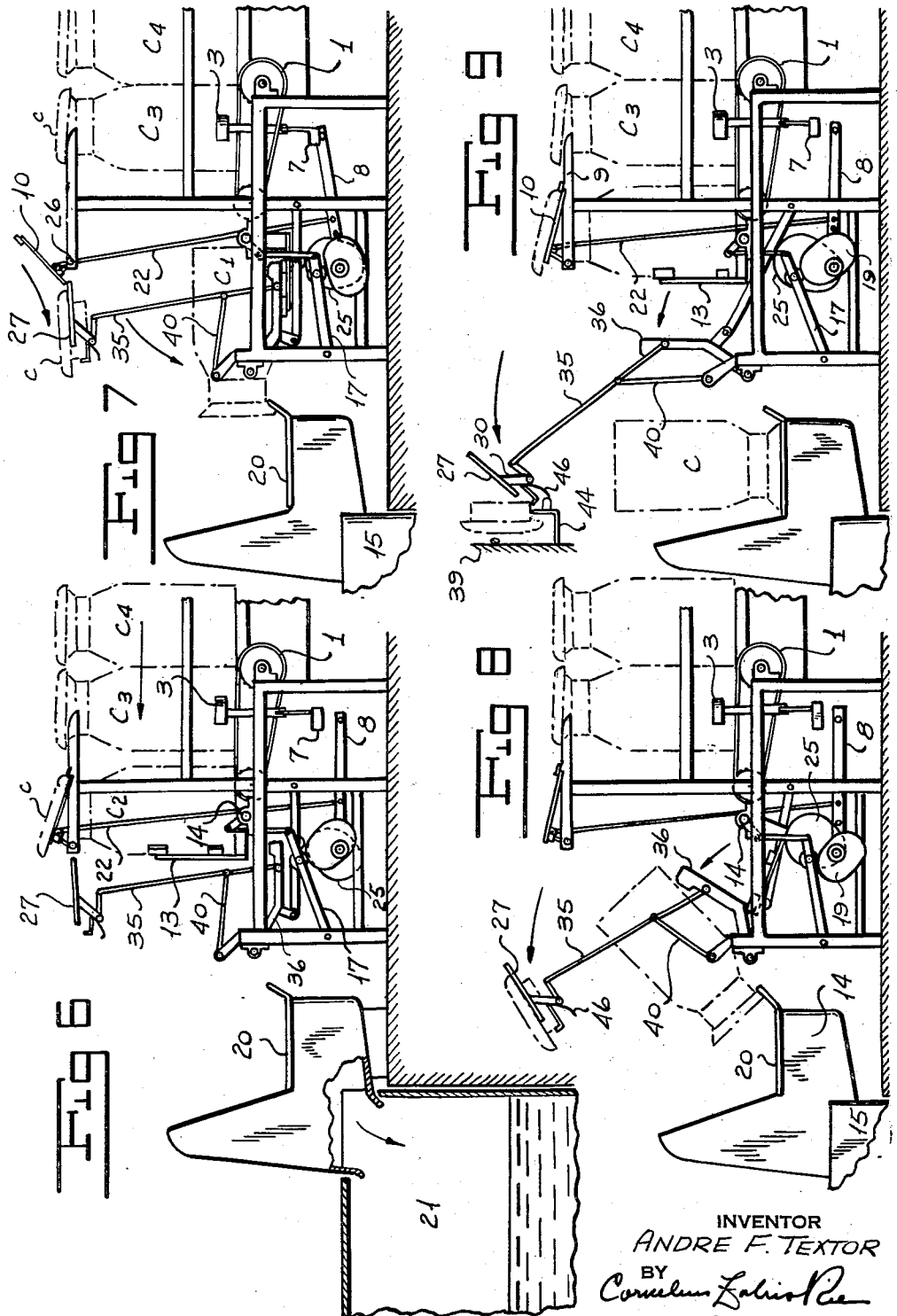

United States Patent Office 2,990,073
Patented June 27, 1961

2,990,073
MACHINE FOR CONVEYING AND DUMPING MILK CANS
Andre F. Textor, 99 Newton Ave., Sussex, N.J.
Filed Mar. 4, 1959, Ser. No. 797,176
4 Claims. (Cl. 214—301)

This invention is a machine adapted primarily to be used in creameries, so that, when the farmer unloads cans of milk at the unloading platform, these cans are moved along a predetermined path. During the resulting travel, the cover is removed from the can, the can inverted to dump the milk into a tank and the empty can and cover transferred to a conventional can washing machine and, after passing therethrough, the can and cover are ready to be returned to the farmer for a subsequent milk delivery to the creamery.

The object of the invention is to provide a relatively simple and highly efficient machine for performing these functions.

The accompanying drawings illustrate one practical embodiment of the invention, but the construction therein shown is to be understood as illustrative, only, and not as defining the limits of the invention.

FIG. 1 is a side elevation of a machine embodying the present invention showing cans in the course of delivery through the machine.

FIG. 2 is a plan section on the line 2—2 of FIG. 1.

FIG. 2A is a fragmental perspective view showing certain devices for holding succeeding cans in restraint while a preceding can is being dumped.

FIG. 3 is a fragmental perspective view of the cover handling mechanism of the machine.

FIG. 4 is a perspective view of the can receiving and dumping mechanism looking from the near side of the machine.

FIG. 5 is a fragmentary elevation showing certain operating mechanisms as viewed from the rear side of the machine, i.e., from the line 5—5 of FIG. 2.

FIGS. 6 through 9, inclusive, are side elevations showing successive operations of the machine in the handling of the can and cover whereby the cover is removed, the can is dumped, and the can and cover are delivered to the can washing machine.

In the drawings, several parts of the machine are mounted upon appropriate framework which maintains the several parts in assembled relation and is provided with appropriate bearings for supports and bearings for such parts.

The milk cans, several of which are indicated in the drawings, are adapted to be placed by the farmer upon a conveyor 1a (FIG. 2) associated with the unloading platform of the creamery and moved along said conveyor, as indicated in FIGS. 1 and 2, to overlapping endless conveyors 1 mounted to travel about toothed drums 2, one of which may be driven from the conveyor 1a or from the main source of driving power, indicated as the motor M in FIG. 1.

As each can moves along on the conveyor 1, it is engaged at its opposite sides by two rollers 3 shown best in FIG. 2A. The purpose of these rollers is to arrest the moving row of cans in advance thereof until the can previously passed through the machine has been dumped and thus makes way for the arrested can. Each of these rollers 3 is supported on an upright lever 4 supported on pivots 5. The lower ends of these levers are connected by a toggle 6, the elbow of which carries a shoe 7. Ordinarily the elbow of the toggle 6 is slightly below dead center and consequently the rollers are locked against separation, so as to arrest the can which engages between them. However, when the machine is clear for the passage of that can, a lever 8, shown in FIG. 1, is moved upwardly as hereinafter described to raise the shoe 7 and move the elbow of the toggle above the dead center and thus permit the can to pass from the position indicated at C3 to position C2.

As it so moves, the under side of the hood of the cover c of the can is engaged by a pair of spaced apart tracks 9, see FIGS. 1 and 3. The forward ends of these tracks are inclined and, as the cover moves and the cover rides onto the track, it is lifted from the can. By the time the can reaches the position C2, the cover c has been moved onto an inclined transfer frame 10 where it is temporarily held against displacement by a hold down strip 11 and lugs 12, as best shown in FIGS. 1 and 3.

By the time the can and cover have moved to the position C2, the can has entered into a cradle 13 pivoted to the frame on a shaft 14 provided with an operating arm 15 which, when oscillated, imparts tilting movement to the cradle. This movement is accomplished through a link 16, the lower end of which is secured to one end of a lever 17 pivoted to the frame as shown in FIG. 1. The lever 17 carries a cam follower 18 cooperating with a lowering cam 19 driven from the motor M through any appropriate change speed gearing. This cam is mounted on the near side of the machine and, as it is rotated, it serves to tilt the cradle 13 and with it the can from the position C2 to the position C1, shown in FIGS. 1 and 7, with the lip of the can over a trough 20 which empties into the milk weighing tank 21 of the creamery.

While the can is being tilted from the position C2 of FIG. 6, to the position C1 of FIG. 7, the cover transfer frame 10 holding the corresponding cover, is moved from the positions shown in FIGS. 3 and 6 to the position shown in FIG. 7. This movement is accomplished by a rod 22 pivoted at its upper end to the cover transfer frame 10 and at its lower end to the lever 8 which actuates the shoe 7 as hereinbefore stated. This lever 8, see FIGS. 7 and 5, is at the far side of the machine. It is pivoted on a fixed bearing 23 and is acted upon by a roller 24 on a cam 25 driven through change speed gearing from the motor M.

As the cam 25 rotates, the roller 24 tilts the cover transfer frame on its pivots 26 (FIG. 3) into the position shown in FIG. 7, so that the can cover c supported on said frame 10 slides off of that frame onto a cover carrier 27. That cover carrier embodies two spaced apart rods 28, the inner ends of which are counterbalanced at 29. To these rods are welded a pair of brackets 30 which are in turn welded to a spacer 31 and to this spacer are welded stop bars 32, the ends of which are upturned. Thus all parts of the cover carrier 21, viz., the parts 28, 29, 30, 31 and 32 are rigidly welded to one another. The brackets 30 are secured by pivots 33 to lugs 34 which are welded to a yoke 35. This yoke is of inverted U shape and its legs extend downwardly and are pivoted to can tilting arms 36. These arms are in turn welded to a U-shaped bracket 37, see FIG. 4, the opposite ends of which are mounted on pivots 38 for pivotal movement on the frame. Brackets 39 are mounted rigidly on the frame and to each of these brackets is pivoted one end of a radius rod 40, the opposite end of which is in turn pivoted to one leg of the yoke 35, as shown best in FIGS. 1, 4 and 8.

By reference to FIGS. 4 and 5, it will be noted that one of the can tilting arms 36 has rigid therewith a bracket 41 pivoted to one end of a lever 42, the other end of which is pivoted to the frame of the machine. This lever carries intermediate its ends the cam follower 43 acted upon by the cam 25. Consequently as this cam rotates, it acts upon both the can and the cover in the following manner.

It raises the lever 42 (FIG. 5) causing the cam tilting arms 36 to swing upwardly from the position shown in FIGS. 5 and 7 to the position shown in FIG. 8. As soon as these arms 36 straddle the cradle 13, they tilt the bottom end of the can upwardly from the position shown in FIG. 7 to the position shown in FIG. 8 to dump the milk from the can into trough 20 and set the can upright in the trough as shown in FIG. 9. At the same time, the movement of the can tilting arms 36 raises the yoke 35 from the position of FIG. 7 through the position of FIG. 8 to the position of FIG. 9. During this elevation of the yoke, the radius rods 40 swing the yoke to the left in these figures and cause the can cover to be deposited on the cover holder of the can washing machine 45 by virtue of the tilting of the cover carrier 27, as indicated in FIG. 9, to positively insure the positioning of the cover in the cover holder 44 in the washing machine. The cover carrier is provided with a projecting horn 46 (FIG. 3) which is adapted to engage with the cover holder as the cover comes into engagement with the latter in order to give the cover a slight kick into position in the holder.

While the cover is being deposited in the holder 44 of the washing machine, the can in position C in FIGS. 1 and 9 is moved by the conveyor 47 (FIG. 2) into the washing machine. Thereafter the can and cover are moved through the washing machine to be thoroughly washed, sterilized, and reassembled, to be turned over to the farmer for his next delivery.

At about the time that the can and cover come into the position of FIG. 9 for delivery to the washing machine, the next can of the group which is lined up on the conveyors 1a and 1 passes between the rollers 3 and is delivered to the cradle 13 so that the operations hereinbefore described are repeated with respect to this next can. These operations are carried on in succession for each can and while succeeding cans are awaiting passage from position C3 to position C2, the conveyors slide under the cans and continue to do so until the machine is ready to dump the next can.

The machine of this invention operates smoothly, with precision, and handles the cans in succession with expedition, to dump these cans without spilling of the milk and deliver both the cans and their covers to the washer in a thoroughly positive and automatic manner.

The foregoing detailed description sets forth the invention in its preferred practical form, but the invention is to be understood as fully commensurate with the appended claims.

Having thus fully described the invention, what I claim as new and desire to secure by Letters Patent is:

1. A machine for dumping milk cans comprising: a milk trough, a normally upright pivoted cradle adjacent said trough, a conveyor for delivering a milk filled can to the cradle while the latter is in upright position, a cover carrier, a cover transfer frame positioned to engage with the under side of the can cover and partially lift and support said cover as the can travels to the cradle, a prime mover, operating connections between the prime mover and the cover transfer frame for operating said frame to remove the cover from the can and transfer it to the cover carrier, driving connections between the prime mover and the cradle for moving the cradle and the can thereon from upright position into a substantially horizontal position of rest with the lip of the can overlying the milk receiving trough to permit the flow of a predetermined portion of the milk from the can into the trough while in said horizontal position, pivoted can tilting arms positioned to underlie the can on the cradle while the latter is in said horizontal position, driving connections between the prime mover and said arms to thereupon invert the can to dump the remaining milk into the trough and deposit the can in said trough, and driving connections between the prime mover and the cover carrier for mechanically discharging the cover from the cover carrier at a predetermined location.

2. A machine for dumping milk cans according to claim 1, wherein the prime mover comprises an electric motor having a driven shaft, and the driving connections comprise link and lever connections operable by cams on said shaft.

3. A machine for dumping milk cans comprising: a milk receiving trough, a normally upright pivoted cradle adjacent the trough, a conveyor for deliverying a milk filled can to the cradle while the latter is in upright position, a motor having a driven shaft, a cam on said shaft, link and lever connections between the cam and the cradle for moving said cradle and can thereon from upright position into a substantially horizontal position of rest with the lip of the can overlying the milk receiving trough to permit a preponderant portion of the milk to flow into the trough while in such horizontal position, pivoted can tilting arms normally in a substantially horizontal position of rest below the cradle and the can thereon when the latter is in said horizontal position, a cam on the motor driven shaft, and link and lever connections between the said latter cam and the can tilting arms to actuate said arms to lift the can from the cradle, invert said can and dump the remainder of the milk into the trough.

4. A machine according to claim 3 comprising: means to restrain the passage of a subsequent can to the cradle until the latter has returned to upright position, said means embodying laterally movable stops overlying the opposite sides of the conveyor normally in the path of a can on the conveyor, a toggle for normally holding them in this normal position to obstruct the passage of a subsequent can, and means to flex the toggle to retract the stops to permit passage of the subsequent can when the cradle has returned to upright position.

References Cited in the file of this patent

UNITED STATES PATENTS

| 1,509,254 | Pilley | Sept. 23, 1924 |
| 1,721,255 | Mitton | July 16, 1929 |
| 2,369,742 | Klaiber et al. | Feb. 20, 1945 |
| 2,413,900 | Abbott | Jan. 7, 1947 |
| 2,738,912 | Kieffaber | Mar. 20, 1956 |

FOREIGN PATENTS

| 556,822 | Great Britain | Oct. 22, 1943 |